E. I. SEAVEY.
Piano-Stool.

No. 168,110. Patented Sept. 28, 1875.

Witnesses.

Edward I. Seavey.
by his attorney.

UNITED STATES PATENT OFFICE.

EDWARD I. SEAVEY, OF BOSCAWEN, NEW HAMPSHIRE.

IMPROVEMENT IN PIANO-STOOLS.

Specification forming part of Letters Patent No. 168,110, dated September 28, 1875; application filed April 29, 1875.

*To all whom it may concern:*

Be it known that I, EDWARD I. SEAVEY, of Boscawen, of the county of Merrimack and State of New Hampshire, have invented a new and useful Improvement in Piano-Stools; and do hereby declare the same to be fully described in the following specification, and represented in the accompanying drawings, of which—

Figure 1:
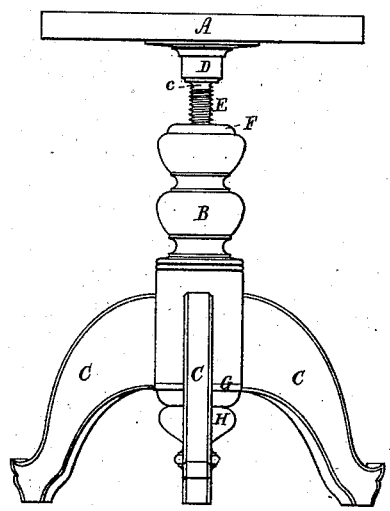
Figure 2:
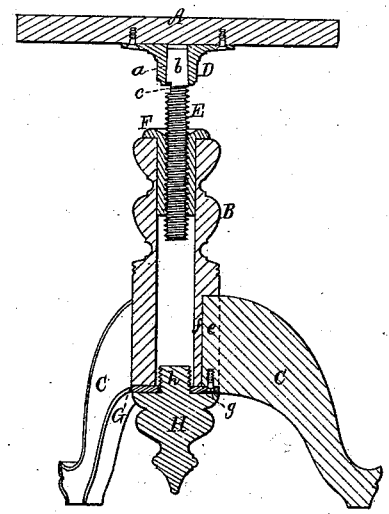
Figure 3:
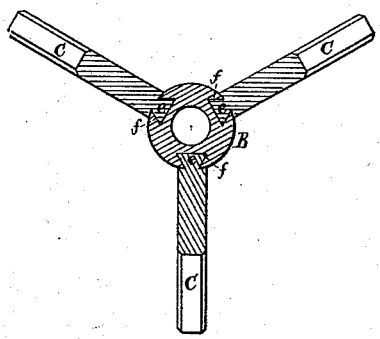

Figure 1 is a front elevation, Fig. 2 a vertical section, and Fig. 3 a horizontal section, of a piano-stool with my invention, whereby the article is not only made very strong and durable, but capable of being readily taken apart and packed in a small compass for transportation, and as readily put together.

In such drawings, A denotes the seat, B the post, and C C C the legs, arranged as in an ordinary stool. The seat I provide on its under side with a metallic socket-piece, D, having a slightly tapering or conical socket, $a$, to receive a correspondingly-formed head or projection, $b$, of the screw E, and to fit closely thereto, the screw at the base of the head being provided with a notch or recess, $c$, made across it.

By forcing a frog or driving a wedge into such recess, the socket-piece D may be started up from the head in which it is to be driven firmly, so as to hold by friction sufficiently to enable the screw to be revolved by the seat, and so maintain their connection as to admit of the stool being lifted by its seat, as occasion may require, for moving it from one place to another in a room.

The screw operates in conjunction with a metallic nut or female screw, F, fixed in the upper end of the tubular post. Each of the legs is provided with a dovetailed tongue, $e$, to enter and fit to a dovetailed groove, $f$, made upward in the post the length of the tongue from the lower end of said post, and there is placed across the lower ends of the said tongues and that of the post a metallic disk, G, which is secured to the legs by screws going up through it and into the tongues, one of said screws being shown at $g$ in Fig. 2. This disk not only prevents the legs from working loose and spreading, so as to break their connections with the post, but answers as the means of supporting a finial, H, provided with a screw, $h$, to screw into the disk, all of which saves all necessity of glueing the legs and the finial to the post. Were such parts glued together, they could not be readily separated for being packed for transportation and as readily put together again.

To enable piano-stools to be made in New England and shipped to South America and the Pacific coast, or various other parts of the world, and there sold at a profit to the maker, or purchaser, it becomes very necessary to have them so constructed as to be easily taken apart and reduced and packed in as little compass as possible. The principal object of my invention will thus be understood.

I claim in the piano-stool as follows:

The seat A, provided with the piece D, having in it a tapering socket, $a$, in combination with the screw E, provided not only with the tapering projection or head $b$ to closely fit the said socket, but with the transverse notch $c$, arranged with the head, as and for the purpose as represented.

EDWARD I. SEAVEY.

Witnesses:
R. H. EDDY,
J. R. SNOW.